United States Patent [19]

Kowalski et al.

[11] Patent Number: 4,880,842

[45] Date of Patent: Nov. 14, 1989

[54] MULTI-STAGE OPACIFYING POLYMER PARTICLES CONTAINING NON-POLYMERIC ACID ABSORBED THEREIN

[75] Inventors: Alexander Kowalski, Plymouth Meeting; Martin Vogel, Jenkintown, both of Pa.

[73] Assignee: Rohm & Haas Company

[21] Appl. No.: 197,063

[22] Filed: May 20, 1988

[51] Int. Cl.$^4$ .................... C08J 9/28; C08F 265/04
[52] U.S. Cl. ......................... 521/64; 521/54; 521/57; 521/134; 523/201; 525/301; 525/902
[58] Field of Search .................. 525/301, 902; 521/64, 521/57, 54, 134; 523/201

[56] References Cited

U.S. PATENT DOCUMENTS

| | | | |
|---|---|---|---|
| 4,107,120 | 8/1978 | Plamoudom et al. | 524/831 |
| 4,181,769 | 1/1980 | Plamoudom et al. | 428/253 |
| 4,226,752 | 10/1980 | Erickson et al. | 525/302 |
| 4,325,856 | 4/1982 | Ishikawa et al. | 523/201 |
| 4,419,496 | 12/1983 | Henton et al. | 525/301 |
| 4,427,836 | 1/1984 | Kowalski et al. | 525/301 |
| 4,468,498 | 8/1984 | Kowalski et al. | 525/301 |
| 4,469,825 | 9/1984 | Kowalski et al. | 523/201 |
| 4,497,917 | 2/1985 | Upsom et al. | 523/201 |
| 4,521,568 | 6/1985 | Mori et al. | 525/309 |

FOREIGN PATENT DOCUMENTS

| | | |
|---|---|---|
| 31964 | 7/1981 | European Pat. Off. . |
| 73529 | 3/1983 | European Pat. Off. . |
| 188325 | 7/1986 | European Pat. Off. . |

Primary Examiner—Morton Foelak
Attorney, Agent, or Firm—Carl W. Battle

[57] ABSTRACT

Multi-stage polymer particles containing one or more void space(s) therein are produced by sequential emulsion polymerization of an essentially low-acid earlier polymer stage, encapsulation of said low-acid polymer stage with at least a final polymer stage, contacting said polymer particles with a non-polymeric carboxylic acid to permit the acid to be absorbed into said low-acid polymer stage and swelling the polymer particles by contacting the particles with an aqueous base. The low-acid polymer stage is formed by emulsion polymerizing a monomer system comprising ethylenically unsaturated monomer(s) and containing less than 5% by weight of monomer(s) containing acid functionality. The low-acid polymer stage is subsequently encapsulated by one or more polymer stages by emulsion polymerizing ethylenically unsaturated monomer(s) in the presence of the low-acid polymer stage. The final stage has a glass transition temperature (Tg) of about 50° C. or greater, and the total polymer stages having a Tg of about 50° C. or greater comprise about 60% or more by weight of the polymer particles. A non-polymeric carboxylic acid is absorbed into the polymer particles and the resultant particles are contacted with base at a pH sufficient to swell the particles with water at a temperature near or above the Tg of the neat polymer or plasticized polymer of the final polymer stage. When dried the particles contain void space(s) therein which produce(s) opacity in compositions in which the particles are contained.

13 Claims, No Drawings

MULTI-STAGE OPACIFYING POLYMER PARTICLES CONTAINING NON-POLYMERIC ACID ABSORBED THEREIN

BACKGROUND OF THE INVENTION

This invention relates to multi-stage polymer particles containing void space(s) therein which are useful as binding or opacifying agents in coating, impregnating and molding compositions.

Core-shell polymer particles are disclosed in U.S. Pat. No. 4,427,836. The polymer particles of the '836 patent are prepared by sequentially emulsion polymerizing a core monomer system comprising monoethylenically unsaturated monomers, one of which has a carboxylic acid group and said carboxylic acid group containing monomer comprising at least 5% by weight of the core monomer system, polymerizing in the presence of the core polymer dispersion a shell monomer system which is permeable to aqueous volatile base selected from ammonia and amines, and neutralizing with ammonia or amine so as to swell said core and form particles which, when dried, contain a single void and cause opacity in compositions in which they are contained. The '836 patent requires that the carboxylic acid be present in the core in a polymeric form. The composition of the shell polymer is such as to be not permeable to fixed or permanent base according to said patent "so that films deposited from aqueous coating compositions comprising a volatile base-swollen core of the core/sheath polymer upon drying and resultant (at least partial) removal by volatilization of the base are not damaged by any permanent base present in the substrate coated or in solutions used later for cleaning the films." (Column 3, ines 35–41). Said patent teaches that "suitable swelling agents for acid-containing cores are ammonia, ammonium hydroxide, or a volatile lower aliphatic amine, such as trimethylamine, and triethylamine." Similarly, U.S. Pat. No. 4,468,498 discloses core-shell polymers having a core of polymeric acid and being swellable by a volatile base.

U.S. Pat. No. 4,594,363 discloses a process for making core-shell polymer particles similar to the '836 patent, except that a fixed or permanent base is used to swell the particles. The '363 patent also requires that the core be polymerized from at least 5% by weight of acid-functional monomer.

U.S. Pat. No. 4,469,825 discloses core-shell polymers having cores which are swellable by acid. High levels of copolymerized acid in the core polymer result in several disadvantages. One such disadvantage is that the acidic copolymers are polar and do not adsorb surfactants well, thus making them unstable and prone to coagulation or aggregation into larger particle. Another disadvantage is that the acidic core polymers have a high affinity for water. This affinity makes it difficult to encapsulate the core with the shell polymer because he core tends to remain at the polymer-water interface on the surface of the composite particle.

The present invention eliminates the instability, coagulation and encapsulation problems of polymers having relatively high levels of copolymerized acid in the core. Applicants have discovered that swellable, multi-stage polymer particles can be prepared by introducing a non-polymeric carboxylic acid to an earlier stage of the particles. By introducing a non-polymeric acid to an earlier stage after polymerization of said earlier stage, (preferably after polymerization of the complete, multistage polymer) applicants have overcome the disadvantages of the core-shell polymers containing copolymerized acid in the core.

It is an object of the present invention to provide opacifying, multi-stage polymer particles having a non-polymeric carboxylic acid absorbed in an earlier stage of the particles. It is a further object of this invention to provide a process for making multi-stage polymer particles wherein the earlier-stage particles are relatively stable and easy to encapsulate.

SUMMARY OF THE INVENTION

This invention relates to opacifying, multi-stage polymer particles containing non-polymeric acid absorbed in an earlier stage and a process for making the polymer particles. The process comprises:

(A) sequentially emulsion polymerizing polymer particles comprising two or more polymer stages wherein
  (1) each of said polymer stages is emulsion-polymerized from a monomer system comprising one or more ethylenically-unsaturated monomer(s) containing one or more —HC=C< group(s);
  (2) the final polymer stage of said particles has a glass transition temperature of about 50° C. or greater;
  (3) at least one low-acid polymer stage, other than said final polymer stage, is prepared from a monomer system containing less than about 5% by weight of monomers containing carboxylic acid functionality;
  (4) each polymer stage is different from any adjacent polymer stage by either about a one percent difference by weight in the amount of any ethylenically unsaturated monomer used therein or by a difference in number average molecular weight between said stage and said adjacent stage of at least about a factor of 2; and
  (5) the polymer stages of said particles having a glass transition temperature of about 50° C. or greater comprise at least about 60% by weight of said particles;

(B) contacting said polymer particles with a non-polymeric compound containing at least one carboxylic acid group before, during or after polymerization of said final polymer stage (2) to permit said acid-containing compound to be absorbed into said low-acid polymer stage (3); and (C) swelling the resulting polymer particles containing said absorbed acid-containing compound with water at or above the glass transition temperature of the next polymer or plasticized polymer of said final polymer stage (2) by contacting said polymer particles with base at a pH sufficient to swell said polymer particles, so as to produce particles which, when dried contain one or more void space(s) within said particles.

The polymer particles are useful as binders, opacifying agents and encapsulants.

DETAILED DESCRIPTION

The present invention involves multi-stage polymer particles containing void space(s) within said particles which are useful as binders, opacifiers in paint and coatings, and as encapsulants for chemically or biologically-active materials. The polymer particles are prepared by:
(A) sequentially emulsion polymerizing polymer particles comprising two or more polymer stages wherein (1) each of said polymer stages is emulsion-polymerized from a monomer system comprising one or more ethylenically-unsaturated monomer(s) containing one or more —HC=C< group(s);

(2) the final polymer stage of said particles has a glass transition temperature of about 50° C. or greater;

(3) at least one low-acid polymer stage, other than said final polymer stage, is prepared from a monomer system containing less than about 5% by weight of monomers containing carboxylic acid functionality;

(4) each polymer stage is different from any adjacent polymer stage by either about a one percent difference by weight in the amount of any ethylenically unsaturated monomer used therein or by a difference in number average molecular weight between said stage and said adjacent stage of at least about a factor of 2; and (5) the polymer stages of said particles having a glass transition temperature of about 50° C. or greater comprises at least about 60% by weight of said particles;

(B) contacting said polymer particles with a non-polymeric compound containing at least one carboxylic acid group before, during or after polymerization of said final polymer stage (2) to permit said acid-containing compound to be absorbed into said low-acid polymer stage (3); and (C) swelling the resulting polymer particles containing said absorbed acid-containing compound with water at or above the glass transition temperature of the neat polymer or plasticized polymer of said final polymer stage (2) by contacting said particles with base at a pH sufficient to swell said polymer particles, so as to produce particles which, when dried, contain one or more void space(s) within said particles.

Each of the polymer stages is sequentially emulsion polymerized from a monomer system comprising one or more ethylenically-unsaturated monomers having one or more groups of the formula —HC=C<. As used herein, the term "stage" refers to the polymer formed during each sequence of polymerization, with the final stage being the last sequence of polymerization and earlier stages being the polymer formed during prior sequences of polymerization. Some suitable examples of ethylenically-unsaturated monomers are styrene, alpha-methylstyrene, vinyltoluene, ethylene, vinyl acetate, vinyl chloride, vinylidene chloride, acrylonitrile, acrylamide methacrylamide, acrylic acid and methacrylic acid, (meth)acryloxypropionic acid, itaconic acid, aconitic acid, maleic acid or anhydride, fumaric acid, crotonic acid, monomethyl maleate, monomethyl fumarate, monomethyl itaconate, and various ($C_1$–$C_{20}$)alkyl or ($C_3$–$C_{20}$)alkenyl esters of (meth)acrylic acid. The expression (meth)acrylic acid is intended to serve as a generic expression embracing both acrylic acid and methacrylic acid; e.g., methyl (meth)acrylate, ethyl (meth)acrylate, butyl (meth)acrylate, 2-ethylhexyl (meth)acrylate, benzyl (meth)acrylate, lauryl (meth)acrylate, oleyl (meth)acrylate, palmityl (meth)acrylate, stearyl (meth)acrylate, and the like. Any of the polymer stages may optionally comprise as one component thereof a small amount of polyethylenically unsaturated monomer, such as ethylene glycol di(meth)acrylate, alyl (meth)acrylate, 1,3-butanediol di(meth)acrylate, diethylene glycol di(meth)acrylate, trimethylolpropane trimethacrylate, or divinylbenzene; the proportion thereof being in the range of about 0.1 to 20%, preferable 0.1% to about 3%, by weight based on the total monomer weight of said polymer stage.

Each of the polymer stages is different from any immediately adjacent polymer stage by either about a one percent difference by weight in the amount of any ethylenically-unsaturated monomer used therein, or by a difference of at least about a factor of 2 in number average molecular weight between said stage and said adjacent stage. Thus, the polymer stages are distinguishable by either the prescribed monomer difference or the prescribed molecular weight difference or both. Each or any stage contains the prescribed amount of one or more of said ethylenically-unsaturated monomers which is not present in the adjacent stage, or the adjacent stage contains the prescribed amount of said ethylenically-unsaturated monomers which is not present in stages immediately adjacent to it, or said adjacent stage contains about one percent more or less of one or more monomers which is present in stages adjacent to it. Alternatively or additionally, each or any stage has a number average molecular weight which is at least twice or less than one-half that of any adjacent stae. Adjacent polymer stage as used herein means a polymer stage which is immediately adjacent and which may be polymerized prior or subsequent to the stage referred to.

The polymer particles of this invention must contain at least one earlier polymer stage (3) which is prepared from a monomer system which contains less than about 5% by weight of monomer(s) containing carboxylic acid functionality. Preferably, the monomer system for this low-acid polymer stage contains less than 2% of monomer(s) having carboxylic acid functionality. High levels of copolymerized carboxylic acid monomers in the earlier stages of these polymer particles have several disadvantages. One disadvantage is that the carboxylic acid copolymers are polar and do not adsorb surfactants effectively, thus, making them unstable and prone to coagulation or aggregation into undesirable larger particles. Additionally, the carboxylic acid-containing polymer stages have a high affinity for water which makes them difficult to encapsulate with other polymer stages. The present invention has overcome the above disadvantages by using little or no carboxylic acid monomer in this earlier polymer stage.

The final polymer stage (2) is also emulsion polymerized from a monomer system comprising one or more ethylenically-unsaturated monomer(s) containing one or more —HC=C< group(s). Examples of suitable monomer for the final polymer stage include the same monomers listed above for preparing the other polymer stages and as described in U.S. Pat. No. 4,427,836, which is herein incorporated by reference. The specific monomers used and the relative proportions thereof in any final polymer stage formed should be such that the final polymer stage is preferably permeable to bases. Similarly, any other polymer stage which is formed subsequent to said low-acid polymer stage (3) should preferably be permeable to bases to allow the bases to diffuse through to the low-acid polymer stage (3) in the subsequent neutralization step.

The final polymer stage (2) must have a Tg of about 50° C. or greater, but the Tg of the final polymer stage may be equal to, less than or greater than the Tg of the earlier polymer stages. Preferably, at least one polymer stage which is formed subsequent to said low-acid polymer stage (3) has a higher Tg than said low-acid polymer stage. Preferably the low-acid polymer stage (3)

has a Tg of about 150° C. or less; more preferably about 90° C. or less. The low-acid polymer stage (3) preferably has a number average molecular weight of about 10,000 or less. The polymer stages having a Tg of about 50° C. or greater cumulatively comprise at least about 60% by weight of the polymer particles.

The Tg of the polymer stages can be calculated using the Fox equation:

$$1/Tg \text{ (polymer)} = W(a)/Tg_{(a)} + W(b)/Tg_{(b)} + \ldots,$$

where $W(a)$ and $W(b)$ are the weight fractions of comonomers (a) and (b) and $Tg_{(a)}$ and $Tg_{(b)}$ are the glass transition temperatures for homopolymers (a) and (b), respectively, Glass transition temperatures for various homopolymers are available in many literature sources, including J. Brandrup and E. H. Immergut, *Polymer Handbook*, 2nd ed., John Wiley & Sons, New York, pp 139–192 (1975).

The first stage of emulsion polymerization in the process of the present invention may be the preparation of a seed polymer consisting of small dispersed polymer particles which are insoluble in the aqueous emulsion polymerization medium. This seed polymer provides particles of minute size which form the nuclei on which the subsequent polymer stages are formed.

As is common to aqueous emulsion polymers, there is used a water-soluble, free-radical initiator, such as hydrogen peroxide, tert-butyl hydroperoxide, or an alkali metal (sodium, potassium or lithium) or ammonium persulfate or a mixture of such an initiator with a reducing agent (such as a sulfite; more specifically an alkali metal metabisulfite, hydrosulfite, or hyposulfite, or sodium formaldehyde sulfoxylate) to form a redox system. The amount of initiator may be from 0.01 to about 2% by weight of the monomer charged and, in a redox system, a corresponding range (0.01 to about 2%) of reducing agent may be used. The temperature may be in the range of about 10° C. to 100° C. In the case of the persulfate systems, the temperature is preferably in the range of 60° C. to 90° C. In the redox system, the temperature is preferably in the range of about 30° to 70° C., more preferably about 40° to 70° C., most preferably in the range of about 55° to 70° C. The proportion of emulsifier may be zero, but, in the situation wherein a persulfate initiator is used, it can range up to about 5 weight percent, based on the weight of monomer charged to the first stage of polymerization. By carrying out the subsequent emulsion polymerization using a low level of emulsifier, the subsequent stages of polymer-formation deposit the most-recently formed polymer on the existing dispersed polymer particles resulting from the preceding step or stage. As a general rule, the amount of emulsifier should be kept between 20% to about 60% of the amount theoretically required to saturate the surface of the polymer particles present in the reaction mixture at any given time as described in U.S. Pat. No. 2,520,959.

Any nonionic or anionic emulsifier may be used, either alone or in combination. Examples of nonionic emulsifiers include tert-octylphenoxyethylpoly(39)ethoxyethanol, dodecyloxypoly(10)ethoxyethanol, nonylphenoxyethylpoly(90(ethoxyethanol, polyethylene glycol 2000 monooleate, ethoxylated castor oil, polyoxyethylene (20) sorbitan monolaurate, sucrose monococoate, di(2-butyl)phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)lauramide, N-lauryl-N-polyoxyethylene(30)amine, and poly(10)ethylene glycol dodecyl thioether. Examples of anionic emulsifiers include sodium lauryl sulfate, sodium dodecylbenzene sulfonate, potassium stearate, sodium dioctyl sulfosuccinate, sodium dodecyldiphenyloxide disulfonate, nonylphenoxyethylpoly(10)ethoxyethyl sulfate ammonium salt, sodium styrene sulfonate, sodium dodecyl allyl sulfosuccinate, sodium or ammonium salts of phosphate esters of ethoxylated nonylphenol, sodium octoxynol-3-sulfonate, sodium cocoyl sarcosinate, sodium 1-alkyloxy-2-hydroxypropyl sulfonate, sodium alpha-olefin ($C_{14}$–$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, and disodium ethoxylated nonylphenol half ester of sulfosuccinic acid.

After the earlier polymer stage or stages are obtained, a subsequent stage or stages of emulsion polymerization is effected to form the final polymer stage on the earlier polymer stages particles. This may be performed in the same reaction vessel in which formation of earlier polymer stages were accomplished or the reaction medium containing the dispersed earlier stage particles may be transferred to another reaction container. It is generally unnecessary to add emulsifier unless a polymodal product is desired. The amount of polymer deposited to form the stages of polymer is generally such as to provide an overall size of the multi-stage polymer particle of about 0.07 to about 4.5 microns, preferably about 0.1 to about 3.5 microns, more preferably about 0.2 to about 2.0 microns, in unswollen condition (that is, before any neutralization to raise the pH to about 5 or higher). Preferably, the weight ratio of polymer stages having a Tg of about 50° C. or greater comprises at least about 80% by weight of the complete multi-stage polymer particles.

In one embodiment of this invention the multi-stage polymer particles are optionally encapsulated by additional polymer having a Tg of about 25° C. or less. Said additional polymer is prepared by emulsion polymerizing one or more ethylenically unsaturated monomer(s) in the presence of the multi-stage polymer. The same monomers as described earlier for preparing the earlier polymer stage can be used in preparing said additional polymer.

In carrying out the emulsion polymerization of the multi-stage polymer particles of this invention, reference can be made to U.S. Pat. No. 4,427,836 for specific process conditions.

Before, during or after polymerization of the final polymer stage (2), the polymer particles are contacted with a non-polymeric compound containing at least one carboxylic acid group for a sufficient period of time to allow the acid-containing compound to be absorbed into the low-acid polymer stage (3). The acid-containing compound should be added after adjusting the polymer composition to pH 4 or less to reduce the compound's solubility in the aqueous phase and increase its solubility in the polymer. Preferably, the acid-containing compound has a solubility in water greater than 0.001% and less than about 2% at pH 5 or less and at the Tg of the final polymer stage. This solubility range is low enough to allow most of the acid-containing compound to absorb into the low-acid polymer stage, yet high enough so that it can diffuse through the aqueous phase to the polymer particles at a sufficient rate. Preferably, the amount of acid-containing compound to the weight of the complete multi-stage polymer particle ranges fromo about 1:2 to about 1:50.

Acid-containing compounds which are useful for this invention include $C_6$-$C_{12}$ aliphatic or aromatic monocarboxylic acids, dicarboxylic acids, and mixtures thereof. Specific examples of acid-containing compounds are benzoic acid, m-toluic acid, p-chorobenzoic acid, o-acetoxybenzoic acid, azelaic acid, sebacic acid, octanoic acid, cyclohexanecarboxylic acid, lauric acid, and monobutyl phthalate. The multi-stage polymer particles containing the non-polymeric acid absorbed in said low-acid polymer stage are swollen when the particles are subjected to a base, at or above the Tg of the neat polymer of Tg of the plasticized polymer of said final polymer stage, which permeates said final polymer stage and induces the polymer particles to swell with water. The amount of base used should adjust the pH of the polymer composition sufficiently to swell the polymer particles. Preferably the composition should be adjusted to a pH of 5.0 or greater, more preferably 6.0 or greater, and most preferably 7.0 or greater. When the water is removed by drying, the shrinkage of said low-acid polymer stage develops void space9s) within the polymer particles. Preferred examples of base are ammonia; volatile lower aliphatic amines, such as trimethylamine and triethylamine; potassium hydroxide; sodium hydroxide; lithium hydorxide; calcium hydroxide; ammonium complexes of zinc, copper, or silver; strontium hydroxide and barium hydroxide.

If desired, the Tg of the neat polymer of the final polymer stage can be lowered during the swelling step to a "plasticized Tg" with a plasticizing solvent to facilitate swelling of the polymer particles upon treatment with base. The plasticizing solvent also aids in penetration of the polymer by the base. Suitable amounts of plasticizing solvents are about 1 to about 100 parts by weight based on 100 parts by weight of polymer. Suitable solvents are any which will plasticize the final polymer stage; for example, hexanol, ethanol, 3-hydroxy-2,2,4-trimethylpentyl isobutyrate, toluene, and the like and mixtures thereof. The solvent can be added either before, after or with the addition of the base. In certain causes the monomer system itself can function as the plasticizing solvent for the polymer.

After being expanded by water to the desired extent, the swollen particles are cooled to a temperature below the Tg of said final polymer stage. The water is then removed from the particles by drying at the lower temperature, resulting in the formation of microvoids within the particles. For best results, the water is removed rapidly from the polymer particles. Slow drying at high humidity may be detrimental to microvoid formation. The multi-stage polymer particle dispersions of the present invention are useful in aqueous coating and impregnating compositions as opacifying agents in such compositions. They are usefuleither as a supplement to, or replacement of, pigmentary matter and/or extenders therefor. For these purposes, the aqueous dispersons of the multi-stage polymer particles may be added directly to the coating and/or impregnating compositions. Alternatively, the multi-stage polymer particles may be isolated fromt he dispersions and dried to make them free-flowing in character so that they can be packaged, sold and shipped or stored before use. The dry powder thus obtained can also be used in coatings based or organic solvents provided the final polymer stage of the multi-stage polymer particles is not soluble in the organic solvent.

Besides being useful in water-based paints based on vinyl or acrylic polymer latices or aqueous solutions of vinyl or acrylic polymers (to replace all or part of opacifying pigments heretofore used, especially those of titanium dioxide), the microvoid-containing particulate polymers of the present invention may be used for similar purposes in other coating systems. These include resin-forming condensation products of thermosetting type, such as phenoplasts and aminoplasts, including urea-formaldehyde and melamine-formaldehyde, and other condensates (e.g., water-dispersible alkyd resins). In addition, polymodal heterpolymers of the present invention having a predominant proportion of the microvoid-containing large mode and a relatively minor proportion of a small mode, but also provide an adhesion-promoting action by way of the small mode.

The following examples are presented to further illustrate this invention. The examples are intended to be illustrative and are not limitative of the present invention. All parts and percentages are by weight unless otherwise indicated.

EXAMPLE I—PREPARATION OF POLY(ISOBUTYL METHACRYLATE) LOW-ACID STAGE

A 3-liter, round-bottomed flask with 4 necks was fitted with reflux condenser, paddle stirrer, thermometer and nitrogen inlet. 1500 grams of deionized water were added to the flask and stirred under a nitrogen atmosphere at 85° C. To the deionized water were added 3 grams of sodium persulfate and 40 grams of an acrylic seed latex having a 46.5% solids content and an average diameter of 95 nanometers. A monomer emulsion (140 g. of water, 6 g. of 23% sodium dodecybenzenesulfonic acid, 360 g. of isobutyl methacrylate and 40 g. of n-dodecyl mercaptan) was added over 2 hours along with 3 g. of sodium persulfate dissolved in 80 g. of water. The resultant latex was held at 85° C. for 30 minutes, cooled and filtered. The resultant low-acid stage polymer latex had an 18.7% solid content, average particle diameter of 260 nanometers and a number average molecular weight of 2000 as measured by gel permeation chromatography.

EXAMPLE II—PREPARATION OF MULTI-STAGE POLYMER PARTICLES WITH BENZOIC ACID ABSORBED IN LOW-ACID STAGE BEFORE POLYMERIZAITON OF FINAL STAGE

To 470 g. of deionized water, stirred under nitrogen in a flask equipped as in Example 1, was added 50 g. of the low-acid stage polymer latex from Example 1 along with 20 g. of benzoic acid. The mixture in the flask was heated to 80° C. and then 1.2 g. of sodium persulfate dissolved in 10 g. of water was added. A monomer mixture of 46 g. of butyl methacrylate, 66.7 g. of methyl methacrylate and 2.3 g. of methacrylic acid was added slowly over a one-hour period to give a second polymer stage. After a 10-minute hold at 80° C. to complete the polymerization, 115 g. of styrene were added over a one-hour period to form the final polymer stage. Then 20 g. of 28% aqueous ammonia were added to swell the particles and the temperature was raised to 85° C. for 30 minutes followed by cooling and filtration. The final latex product had a 28.9% solids content and pH of 9.4. Diluted latex was dried on a microscope slide and immersed in hydrocarbon oil ($n_D=1.51$) and examined with an optical microscope at 900X. A single air void can be seen inside each particle as a dark circle. The swollen multi-stage polymer latex was incorporated into a film to measure the Kubelka-Munk scattering coefficient (S/mil) as described in U.S. Pat. No. 4,427,836. S/mil of the resultant film was 0.12.

EXAMPLE III—PREPARATION OF MULTI-STAGE POLYMER PARTICLES WITH BENZOIC ACID ABSORBED IN LOW-ACID STAGE DURING POLYMERIZATION OF FINAL STAGE

Multi-stage polymer particles were prepared following the procedures of Example II, except that the benzoic acid was mixed with styrene and this mixture was added to the flask over a one-hour period. The resulting latex product had a 28.3% solids content, pH of 9.9 and S/mil of 0.16. Voids were noticeable in the dry polymer particles through examination under a microscope.

EXAMPLE IV—PREPARATION OF MULTI-STAGE POLYMER PARTICLES WITH BENZOIC ACID ABSORBED IN LOW-ACID STAGE AFTER POLYMERIZATION OF FINAL STAGE

Multi-stage polymer particles were prepared following the procedures of Example II, except that the benzoic acid was added to the flask immediately after addition of the styrene was complete. When the ammonia was added, the latex became thick and 100 grams of water were added. The resulting latex product had a 23.3% solids content, pH of 9.7 and S/mil of 0.13. Examination of dry polymer particles under a microscope showed a single void in each particle.

EXAMPLE V—PREPARATION OF MULTI-STAGE POLYMER PARTICLES HAVING BUTYL METHACRYLATE EARLIER STAGE AND AZELAIC ACID ABSORBED THEREIN

A low molecular weight, earlier stage latex was prepared following the procedures of Example I, except that 50 grams of an acrylic latex seed (41.3% solids, average diameter 57 nm( were used and isobutyl methacrylate was replaced with an equal amount of butyl methacrylate. The resulting latex has an 18.8% solids content and an average particles diameter of 150 nm.

This earlier stage latex as then used to prepare multi-stage polymer particles following the procedures of Example II, except that the amount of initial deionized water was increased to 700 grams and benzoic acid was replaced with azelaic acid. The resulting multi-stage latex product had a 23.8% solids conotent, pH of 9.4, average particle diameter of 470 nm, and S/mil of 0.20.

EXAMPLE VI

A high molecular weight earlier stage latex was prepared following the procedures of Example V, except that the n-dodecyl mercaptan was excluded. The resulting latex had a 17.4% solids content and an average particle diameter of 156 nm.

This earlier stage latex waqs then used to prepare multi-stage polymer following the procedures of Example V. The resulting multi-stage latex product had a 24.4% solids content, pH of 9.2, average particle diameter of 482 nm, and S/mil of 0.15.

EXAMPLE VII—PREPARATION OF MULTI-STAGE POLYMER PARTICLES HAVING BUTYL ACRYLATE EARLIER STAGE

Multi-stage polymer particles were prepared following the procedures of Example VI,e xcept that butyl methacrylate in the earlier stage was replaced with an equal amount of butyl acrylate. The resulting multi-stae latex product had a 23.4% solids content, pH of 9.4, average particle diameter of 503 nm and S/mil of 0.11.

EXAMPLE VIII—PREPARATION OF MULTI-STAGE POLYMER PARTICLES HAVING METHYL METHACRYLATE EARLIER STAGE

Multi-stage polymer particles were prepared following the procedures of Example V, except that butyl methacrylate in the earlier stage was replaced with an equal amount of methyl methacrylate. The resulting multi-stage latex product had a 24.0% solids content, pH of 9.3, average particle diameter of 477 nm, and S/mil of 0.08. The earlier polymer stage had an estimated Tg of 75° C.

EXAMPLE IX—PREPARATION OF MULTI-STAGE POLYMER PARTICLES HAVING STYRENE EARLIER STAGE

Multi-stage polymer particles were prepared following the procedures of Example V, except that butyl methacrylate in the earlier stage was replaced with an equal amount of styrene. The resulting multi-stage latex product had a 24.1% solids content, pH of 9.3, average particle diameter of 389 nm, and S/mil of 0.11. The earlier polymer stage had a measured Tg of 70° C. by differential scanning calorimetry.

We claim

1. A process for preparing opacifying polymer particles containing one or more void space(s) within said particles comprising:
    (A) sequentially emulsion polymerizing polymer particles comprising two or more polymer stages wherein
        (1) each of said polymer stages is emulsion-polymerized from a monomer system comprising one or more ethylenically-unsaturated monomer(s) containing one or more —HC=C< group(s);
        (2) the final polymer stage of said particles has a glass transition temperature of about 50° C. or greater;
        (3) at least one essentially low-acid, earlier polymer stage, other than said final polymer stage (2), is prepared from a monomer system which contains less than about 5% by weight of monomers containing carboxylic acid functionality;
        (4) each polymer stage is different from any adjacent polymer stage by either about a one percent difference by weight in the amount of any ethylenically unsaturated monomer used therein or by a difference in number average molecular weight between said stage and said adjacent stage of at least about a factor of 2; and
        (5) the polymer stages of said particles having a Tg of about 50° C. or greater comprises at least about 60% by weight of said particles;
    (B) contacting said polymer particles with a non-polymeric alipharic or aromatic carboxylic acid(s)

having 6 to 12 carbon atoms containing at least one carboxylic acid group before, during or after polymerization of said final polymer stage (2) to pemit said acid-containing compound to be absorbed into said low-acid polymer stage (3); and (C) swelling the resulting multi-stage polymer particles containing said absorbed acid-containing compound with water, an optical plasticizing solvent, at or above the glass transition temperature of the neat polymer or glass transition temperature of the optionally plasticized polymer of said final polymer stage (2) by contacting said particles with base at a pH sufficient to swell said polymer particles, so as to produce particles which, when dried, contain one or more void space(s) within said particles.

2. A process of claim 1 wherein said low-acid polymer stage (3) has a glass transition temperature of about 150° C. or less.

3. A process of claim 1 wherein said low-acid polymer stage (3) has a glass transition temperature ofa bout 90° C. or less.

4. A process of claim 1 wherein said low-acid polymer stage (3) has a number average molecular weight of about 10,000 or less.

5. A process of claim 1 wherein said polymer stages having a Tg of about 50° C. or greater comprises at least about 80% by weight of said particles.

6. A process of claim 1 wherein said non-polymeric, acid-containing compound has a solubility in water of about 2% of less by weight at the glass transition temperature of said final polymer stage (2), and the amount of said acid-containing compound to the weight of said multi-stage polymer particles is about 1:2 to about 1:50.

7. A process of claim 6 wherein said non-polymeric, acid-containing compound is selected from $C_6$–$C_{12}$ aliphatic or aromatic mono- and di-carboxylic acids.

8. A process of claim 6 wherein said non-polymeric, acid-containing compound is selected from benzoic acid, m-toluic acid, p-chorobenzoic acid, o-acetoxybenzoic acid, azelaci acid, sebacic acid, octanoic acid, cyclohexanecarboxylic acid, lauric acid, and monobutyl phthalate.

9. A process of claim 1 wherein said ethylenically-unsaturated monomer(s) are selected from styrene, alpha-methylstyrene, vinyltoluene, ethylene, vinyl acetate, vinyl chloride, vinylidene chloride, acrylonitrile, acrylamide, methacrylamide, acrylic acid, methacrylic acid, acryloxypropionic acid, methacryloxypropionic acid, itaconic acid, aconitic acid, maleic acid, maleic anhydride, fumaric acid, crotonic acid, monomethyl maleate, monomethyl fumarate, monomethyl itaconate, and ($C_1$–$C_{20}$) alkyl or ($C_3$–$C_{20}$) alkenyl esters of acrylic and methacrylic acid.

10. A process of claim 1 wherein said low-acid polymer stage (3) is prepared from a monomer system which contains essentially no monomer(s) having carboxylic acid functionality.

11. A process of claim 1 wherein said multi-stage polymer particles are further encapsulated by additional polymer having a glass transition temperature of less than about 50° C. by emulsion polymerizing one or more ethylenically unsaturated monomer(s) containing one or more —HC=C< group(s) in the presence of said multi-stage polymer particles.

12. A process of claim 11 wherein said additional polymer has a Tg of about 25° C. or less.

13. A process of claim 1 wherein said base is selected from ammonia; potassium hydroxide; sodium hydroxide; lithium hydroxide; calcium hydroxide; stronium hydroxide; barium hydroxide; volatile lower aliphatic amines; and ammonium complexes of zinc, copper and silver.

* * * * *